United States Patent [19]
Ellis

[11] Patent Number: 5,657,502
[45] Date of Patent: Aug. 19, 1997

[54] LOADING LIP EXTENDER OPERATING MECHANISMS FOR EDGE MOUNTED DOCK LEVELERS

[75] Inventor: Lawrence D. Ellis, Monrovia, Calif.

[73] Assignee: Ellis Industries, Inc., So. El Monte, Calif.

[21] Appl. No.: 535,972

[22] Filed: Sep. 29, 1995

[51] Int. Cl.$^6$ .................................................. E01D 1/00
[52] U.S. Cl. .................................................. 14/71.1; 14/71.3
[58] Field of Search .................................. 14/69.5, 71.1, 14/71.3, 71.7

[56] References Cited

U.S. PATENT DOCUMENTS

| | | | |
|---|---|---|---|
| 3,974,537 | 8/1976 | Ellis et al. | 14/71.3 |
| 4,065,824 | 1/1978 | Ellis et al. | 14/71.3 |
| 4,689,846 | 9/1987 | Sherrod | 14/71.3 |
| 4,935,979 | 6/1990 | Walker et al. | 14/71.1 |
| 5,195,205 | 3/1993 | Cook | 14/71.1 |
| 5,214,818 | 6/1993 | Cook | 14/71.1 |
| 5,343,583 | 9/1994 | Cook | 14/71.3 |

Primary Examiner—James Lisehora
Attorney, Agent, or Firm—Edward J. DaRin

[57] ABSTRACT

A loading lip extender operating mechanism for edge mounted dock levelers to elevate and lower a bridge plate connected to a dock and loading lip plate pivotably coupled to the bridge plate to follow the movements imparted to the bridge plate. The elevation of the bridge plate to a vertical orientation causing the loading lip plate to be extended above the level of the dock. The loading lip plate can be moved forwardly of the vertical position of the bridge plate outwardly and upwardly so it is extended over the truck bed parked adjacent the dock and dropped onto the truck bed to permit loading and/or unloading of the truck. The bottom side of the bridge plate carries a camming surface for coaction with a cam follower included with the lip extender operating mechanism. The operating mechanism is constructed as a unitary structure having quick release mounting clips to allow the unitary structure to be quickly mounted and de-mounted in essentially "zero" time. A lever actuated loading lip extender is provided for raising and lowering the loading lip plate that is coupled to the bridge plate to impart rotary forces thereto to elevate and lower the bridge plate along with the loading lip plate.

7 Claims, 5 Drawing Sheets

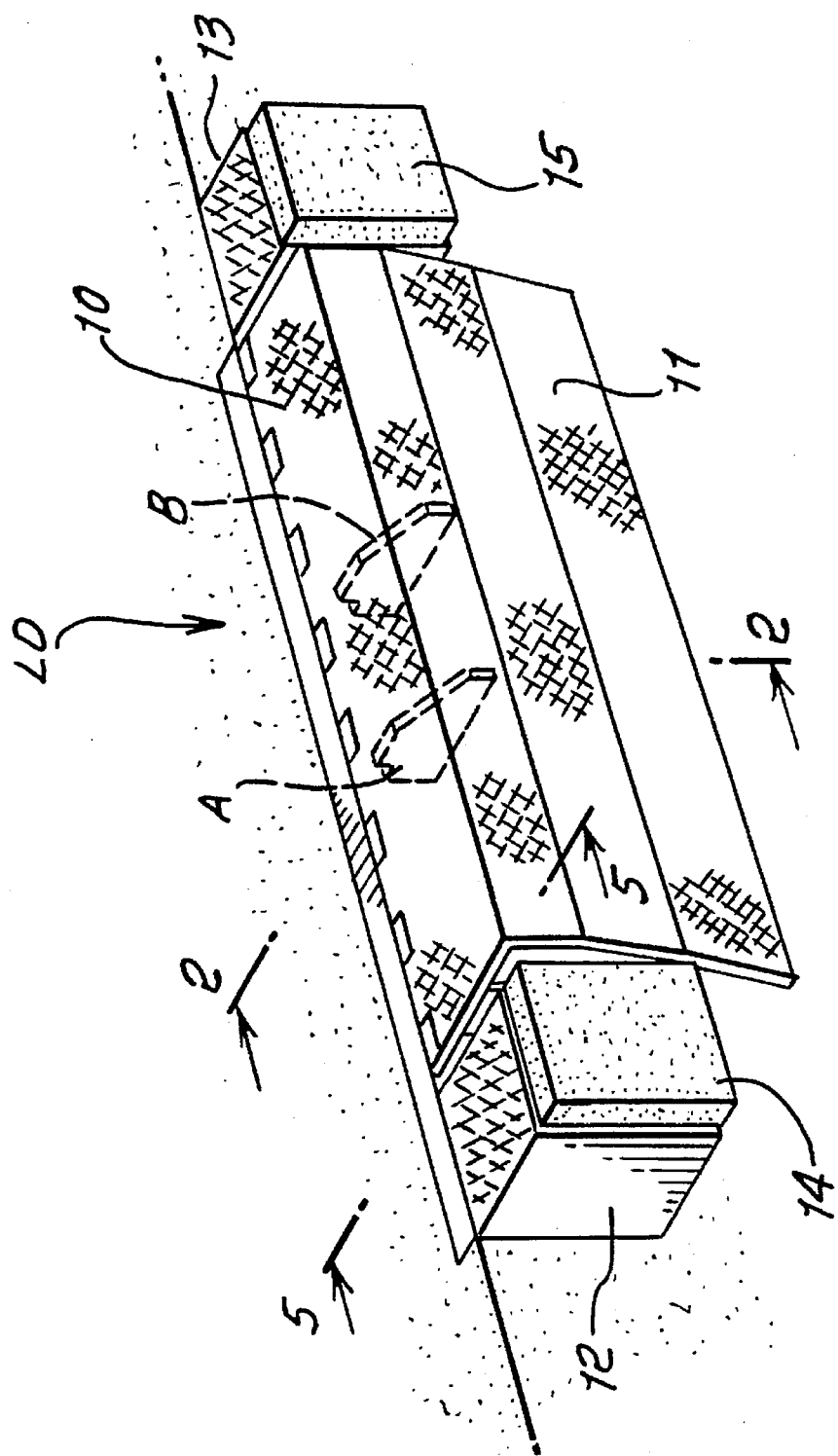

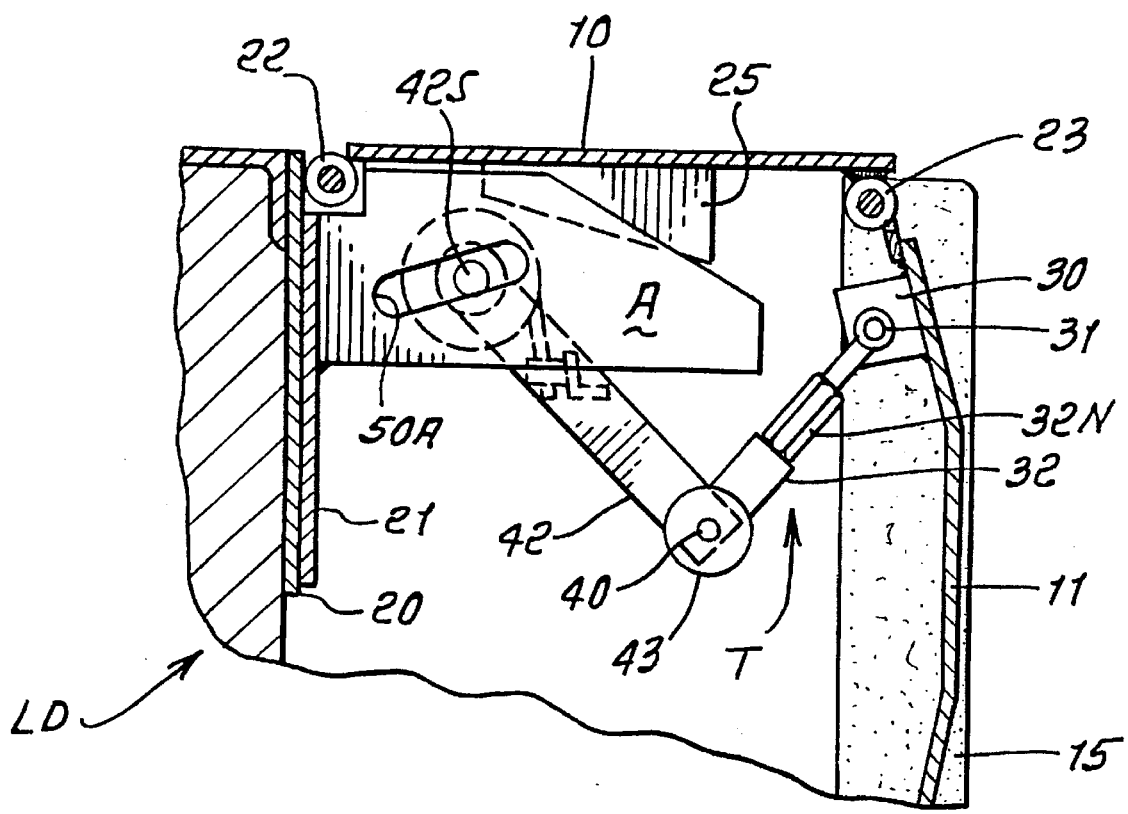
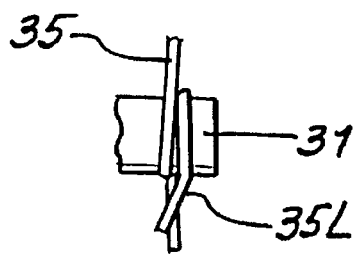
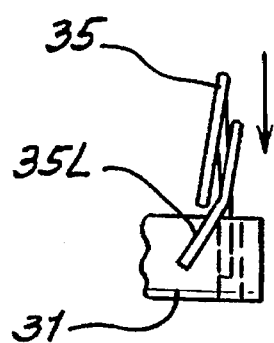

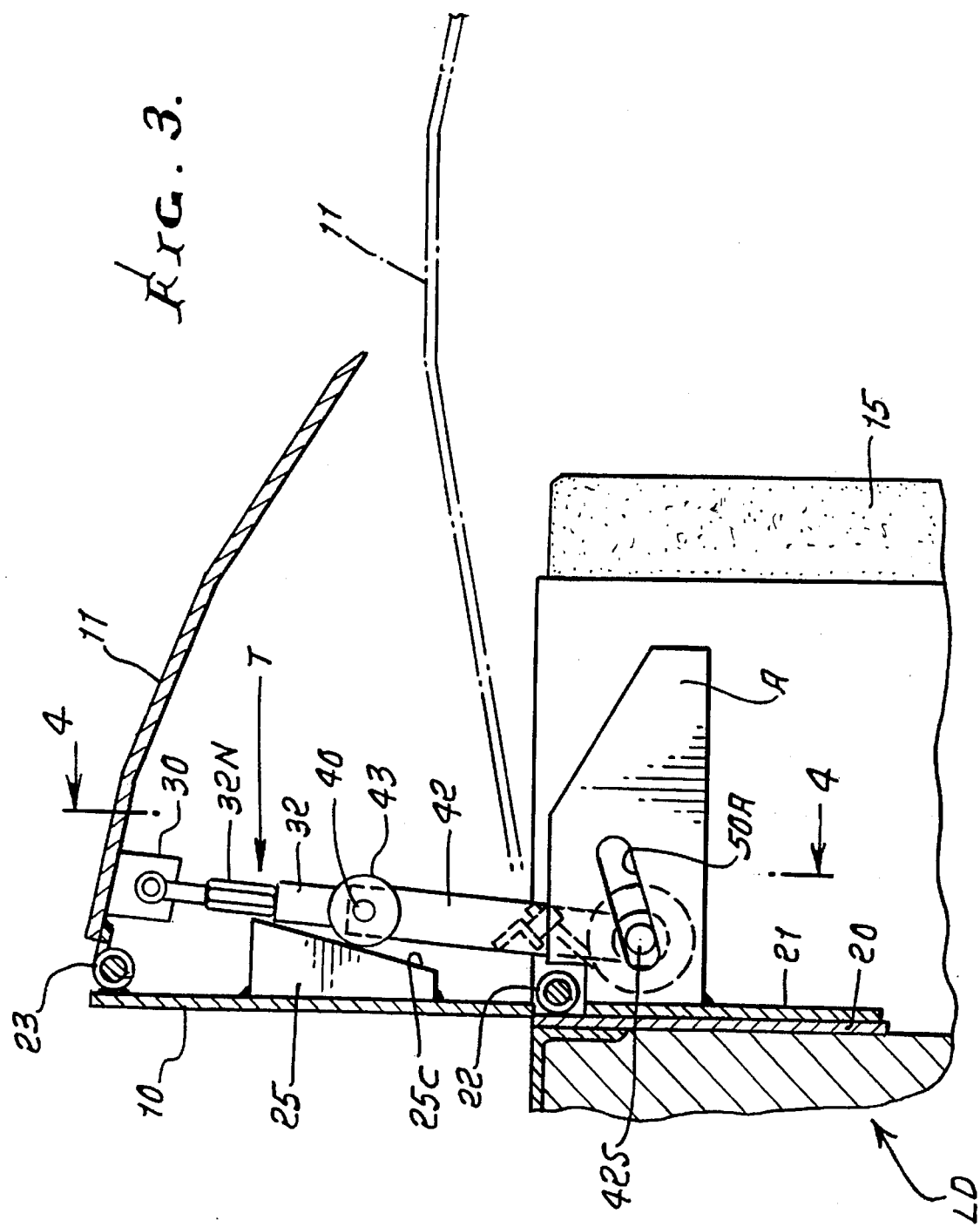

LOADING LIP EXTENDER OPERATING MECHANISMS FOR EDGE MOUNTED DOCK LEVELERS

FIELD OF INVENTION

This invention relates to an improved loading Lip Extender Operating Mechanism for edge mounted Dock Levelers for bridging the gap between the rear of a truck bed and the top of an unloading and/or loading dock.

BACKGROUND OF INVENTION

The present invention is an improvement over the edge mounted loading lip extender operating mechanisms disclosed in my U.S. Pat. Nos. 3,974,537 and 4,065,824. The operating mechanisms disclosed in each of my earlier granted patents are actuated by manually lifting the dock levelling plates from a position behind the dock levelling plates that have led to back injuries to the personnel lifting the dock levelers in the manner disclosed in my above U.S. patents. U.S. Pat. No. 4,065,824 aids the worker to lift the dock levelling plates by the provision of a counter-balance in the form of an elongated heavy duty coil spring for exerting pressure to assist the operating personnel in lifting the weight of the dock levelling plates consisting of a bridge plate pivotably mounted to the loading dock and a load levelling plate pivoted to the bridge plate to be movable therewith. The counter-balance spring mentioned also functions to resist the downward movement of the dock levelling plates in providing a counter-balancing force when the load levelling plate is moved downwardly for positioning it on the bed of a truck parked adjacent the loading/unloading dock.

SUMMARY OF THE INVENTION

The present invention provides an improved and simplified operating mechanism for edge mounted dock levelers of the type of my above mentioned U.S. patents that provides a simplified and more reliable, operating mechanism and an operating handle for raising and lowering the dock levelling plates to minimize the chief causes of back injuries to operating personnel. The improved operating mechanism is designed to permit the mechanism to be quickly installed between a pair of spaced mounting plates as a unit and to be quickly released from the mounting plates through the provision of a pair of removable pins or clips including at least an anti-theft or anti-tampering clip thereby minimize or essentially reduce to "zero" the down time of the mechanism.

From a broad structural standpoint the invention comprehends dock leveler plates consisting of bridge plate means pivotably connected to the loading/unloading dock at one end thereof along an edge of the dock and normally assuming a horizontally aligned position with the dock and a load levelling lip extender plate means pivotally mounted to the outer edge of the bridge plate means for pivotal movements in response to the movements imparted to the bridge plate means. The improved operating mechanism is mounted as a unit between a pair of spaced side plates extending outwardly of the dock below the bridge plate means. The side plates include elongated slots for accomodating the pivotal and sliding movements of the operating mechanism in response to the manual operating forces imparted to the bridge plate means by an elongated operating lever secured to the bridge plate means to permit the raising and lowering of the bridge plate means and the load levelling plate means from a storage position on the dock to a vertical or cart stop position with respect to the dock and a loading/unloading position extending the load levelling plate means outwardly for positioning it into a truck bed parked adjacent the dock.

The operating mechanism comprises toggle arm means pivotably secured to the loading lip extender plate means and pivotably secured to a lower link arm means with the link arm means being coupled to the elongated slot means to provide the pivotal and sliding movements of the lower link arm means with the application of lifting forces to the bridge plate means and the application of extension forces for positioning the load levelling lip means on a truck bed.

The operating lever is adapted to be secured to the bottom side of the bridge plate means for permitting an operator to exert operating forces on the order of twenty pounds to move the bridge plate means between a stored position, a vertical or cart stop position, and positioning the loading lip plate means over a truck bed for positioning therein or removal therefrom. This essentially eliminates the chief cause of operator back injuries in moving the dock plates due to the mechanical advantage afforded by the use of the operator lever.

BRIEF DESCRIPTION OF THE DRAWINGS

These and other features of the present invention may be more fully appreciated when considered in the light of the following specification and drawings in which:

FIG. 1 is a front perspective view of a loading/unloading dock illustrating the conventional and normal positions of the load levelling plates and illustrating the location of the operating mechanism side plates in dotted outline for the purposes of the present invention;

FIG. 2 is a cross-sectional view of the operating mechanism of the present invention taken along the line 2—2 of FIG. 1 and illustrating the operating mechanism in its normal storage position and embodying the present invention;

FIG. 3 is a cross-sectional view of the operating mechanism after the bridge plate means has been moved to a vertical or cart stop position and the loading lip plate is being illustrated in dotted outline after positioning in an outwardly extended position;

FIG. 4 is a front elevational view of the operating mechanism taken along the line 4—4 of FIG. 3;

FIG. 7 is a partial, elevational view of an anti-tamper clip installed on the clevis pen for the toggle arm; and FIG. 8 is a view of the detached clip of FIG. 7 immediately prior to installation.

DETAILED DESCRIPTION OF THE PREFERRED EMBODIMENT OF THE INVENTION

Figure 9:
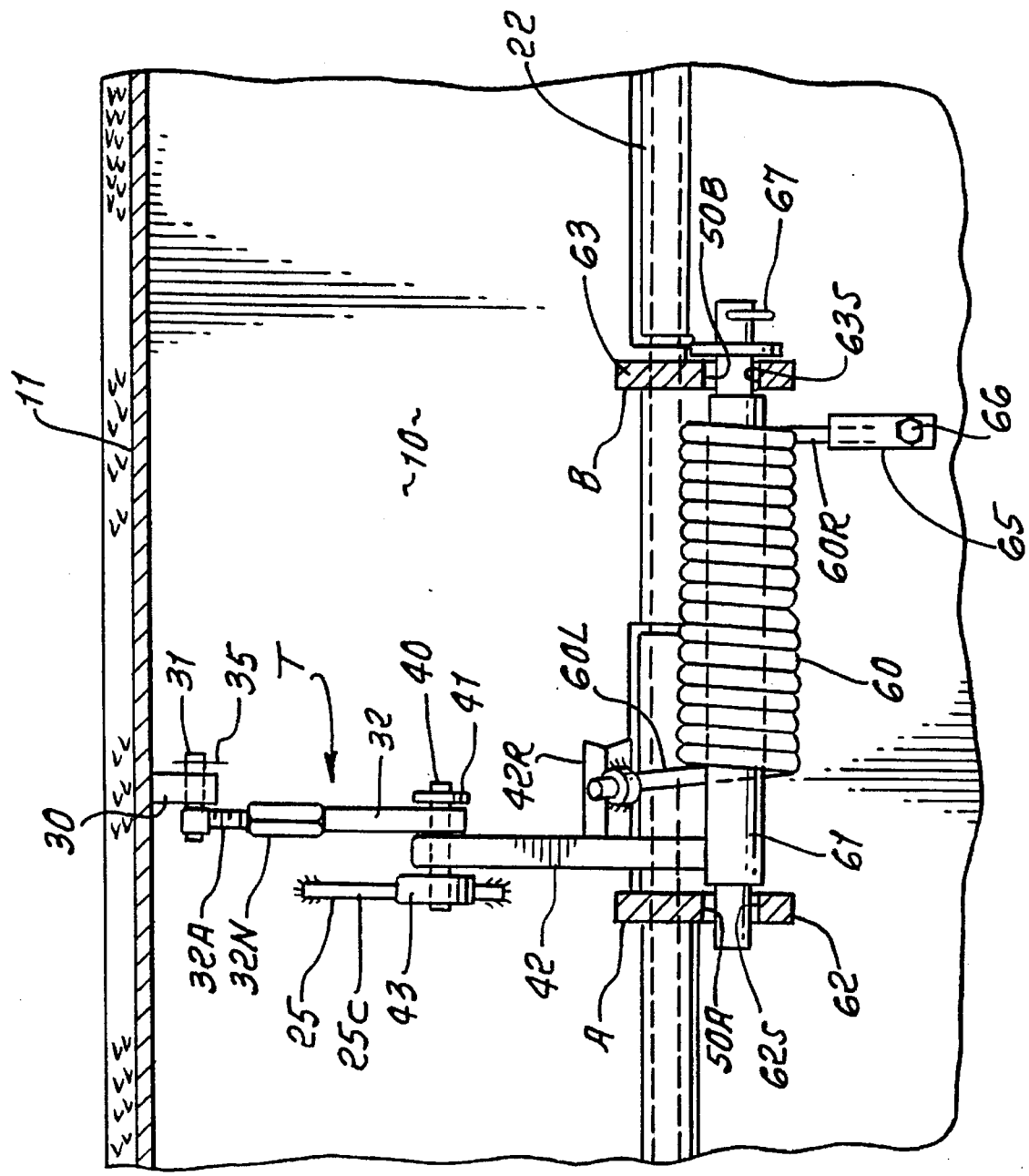

Now referring to the drawing, the present day arrangement of a loading dock LD with the conventional bridge plate 10 is illustrated in FIG. 1 pivotably connected to the dock LD and pivotably connected to the loading lip plate 11 and is illustrated in its normal or storage position. The operating mechanism for extending the plates 10 and 11 is not illustrated in FIG. 1. As illustrated the outside wall of the dock LD is provided with a pair of bumper boxes 12 and 13 arranged flush with the top of the dock and along side of the plates 10 and 11. The front faces of the bumper boxes 12 and 13 are provided with resilient bumpers 14 and 15 of a preselected molded material to extend outwardly of the leveler plates 10 and 11 to afford protection to the leveler operating mechanism mounted therewith against damage from trucks backing into the assembly; see FIGS. 1–3, for example. Although the operating mechanism of the present invention is omitted from FIG. 1, the mounting side plates normally employed for mounting the mechanism of the present invention are illustrated in FIG. 1 in dotted outline and identified as plates A and B located below the bridge plate 10, as will be discussed more fully hereinafter. The prior art devices functioning in the manner of the present invention, and for a better understanding of my improvements thereto may be appreciated from reviewing my U.S. Pat. Nos. 3,974,537 and 4,065,824 that are incorporated herein by reference.

Now referring to FIGS. 2–4, in particular, the loading lip plate extender operating mechanism as it may be mounted to the edge of the dock LD will now be discussed. The dock LD is illustrated for mounting the operating mechanism thereto as is now conventional and includes a plate 20 overlying the front face of the dock from the upper edge thereof downwardly and is permanently installed thereon, as illustrated. A square plate 21 is secured to the plate 10 and has its upper end spaced from the top of the dock LD to accomodate a hinge 22 for pivotably securing the bridge plate means 10 thereto. The plates 20 and 21 are merely employed to secure the operating mechanism to the dock LD and other means may be utilized for this purpose. The bridge plate means 10 is normally mounted to be flush with the top of the dock LD and to extend horizontally outwardly thereof, as illustrated. The bottom outer edge of the bridge plate means 10 carries a hinge 23 and is connected to the load levelling plate means 11 and normally depends therefrom, as illustrated in the storage position of FIG. 2. The bridge plate 10 has welded to the bottom side thereof a cam 25 having an outer camming surface 25C in the form of an inclined surface wherein the width of the cam decreases in width from the top to the bottom as viewed in FIG. 3.

The loading lip extender operating mechanism comprises toggle arm means T pivotably connected to the bottom side of the load levelling plate 11 adjacent to and spaced from the hinge 23. The toggle arm means T comprises a lug 30 welded to the bottom side of the plate 11 and mounts a toggle clevis pin 31 that extends outwardly from both sides of the lug 30, see FIG. 4. The toggle arm 32 has a threaded end 32A and a nut 32N mounted to toggle arm 32 for adjusting the length of the toggle arm and controls the lip position in relationship to the face of the bumpers 14 and 15. This adjustment also controls the height above a truck bed and allows the toggle arm means T to lock in the vertical or cart stop position illustrated in FIGS. 3 and 4. The clevis pin 31 is secured to the lug 30 by means of a clip, preferably an anti-tamper or anti-theft clip 35 mounted in a suitable aperture provided at the end of pin 31. The anti-tamper clip 35 illustrated is of a commercial construction and is formed with a leg 35L functioning as a cam ram for lifting the clip ring over the end of the pin 31 and the ease of installation can be appreciated by examining FIGS. 7 and 8. It should be understood that other commercially available clips may be employed for either automatic locking or manual locking of the pin 31.

The other end of the toggle arm 32 is mounted on a shaft 40 and is secured thereto between a washer 41 and a lower link arm means 42 for pivotal movement with the toggle arm means T in response to the movements imparted to the plates 10 and 11. A cam follower wheel 43 is mounted to the remaining end of the shaft 40 so that it rides on the cam surface 25C of the cam 25 for locking the toggle arm 32 and the link arm 42 in the cart stop or vertical position illustrated in FIGS. 3 and 4. The side plates A and B are welded to the plate 21 and are each provided with an elongated slot for accomodating the pivotal and sliding movements of the toggle arm means T and the lower link arm means 42 by means of shaft 42S extending between the plates A and B in moving from the storage position illustrated in FIG. 2 to the cart stop position of FIG. 3 and in the reverse direction. The elongated slot for the plate A is identified as the slot 50A while the slot 50B is formed in plate B, as illustrated. The pivotal movement of arm 42 upwardly causes the shaft 42S to slide in slots 50A and B during the pivotal movement between FIGS. 2 and 3 and reverse. These slots permit ready removal and installation of the mechanism.

As in my prior referenced patents the operating mechanism when arranged in its vertical position or cart stop position may be left in that position at all times to act as a cart stop, if desired.

The present invention includes counter-balancing means for assisting the operator in lifting the plates 10 and 11 and when the plates are moved in a downward direction for counter-balancing the weight of the plates. The counter-balancing means is illustrated in the form of an elongated heavy duty coil spring 60 mounted on the main shaft 61 supported on a pair of slotted support arms 62 and 63; see FIG. 4. The shaft 61 is provided with ends of a reduced diameter to be accomodated in the slots 62S and 63S for the support arms 62 and 63 respectively. The slots 62S and 63S are open on one end to permit the ready installation of the shaft 61 therein. The support arms 62 and 63 are welded to the plate 21 or otherwise secured to the dock LD. One end of the spring 60, the left hand end 60L, as viewed in FIG. 4, is adapted to bear against the lower link means 42 at the reinforcing element 42R for exerting pressure against the lower link means 42 by means of the spring end 60L secured to the lower link arm reinforcing element 42, as illustrated. The force of the spring 60 exerted on the link 42 assists in lifting the combined weights of the plates 10 and 11 to thereby reduce the force required to lift these plates by the operator. The opposite end of the spring 60 or the end 60R is formed to extend into the open end of a sleeve 65 and is preferably threaded thereto. The sleeve 65 mounts as adjusting bolt 66 with the opposite end thereof bearing against the dock or the plate 21. The rotation of the bolt 66 will move the sleeve 65 toward or away from the dock to thereby adjust the amount of forces exerted by the spring 60 and the end 60L against the lower link arm means 42. The shaft 61 may be secured by any quick release clip, preferably a hair pin clip 67 positioned in a suitable aperture adjacent the right hand end thereof as seen in FIG. 4.

With the above structure in mind, it should now be understood that the above described operating mechanism may be installed as a unit for operation or released from the dock LD as a unit by the insertion of or removal of the two clips 35 and 67. This unitary assembly of the operating mechanism permits the quick release and installation of the mechanism whereby essentially "zero" downtime of the operating mechanism is experienced.

Figure 5:
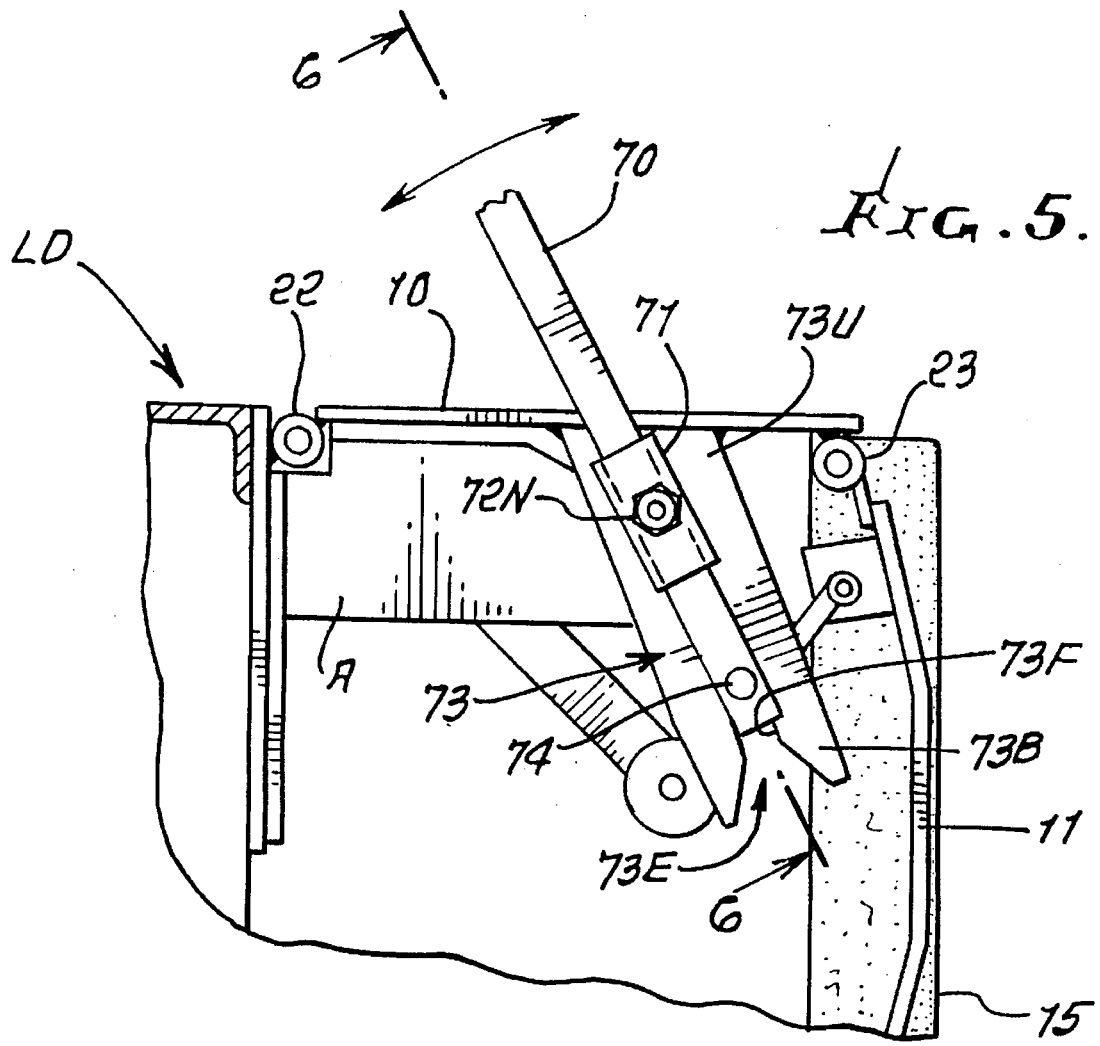
FIG. 5 is a cross-sectional view taken along the line 5—5 of FIG. 1 and illustrating the operating lever secured to the bridge plate when it is in its normal storage position and on the outside of the dock leveler mounting side plates in accordance with the present invention.
Figure 6:
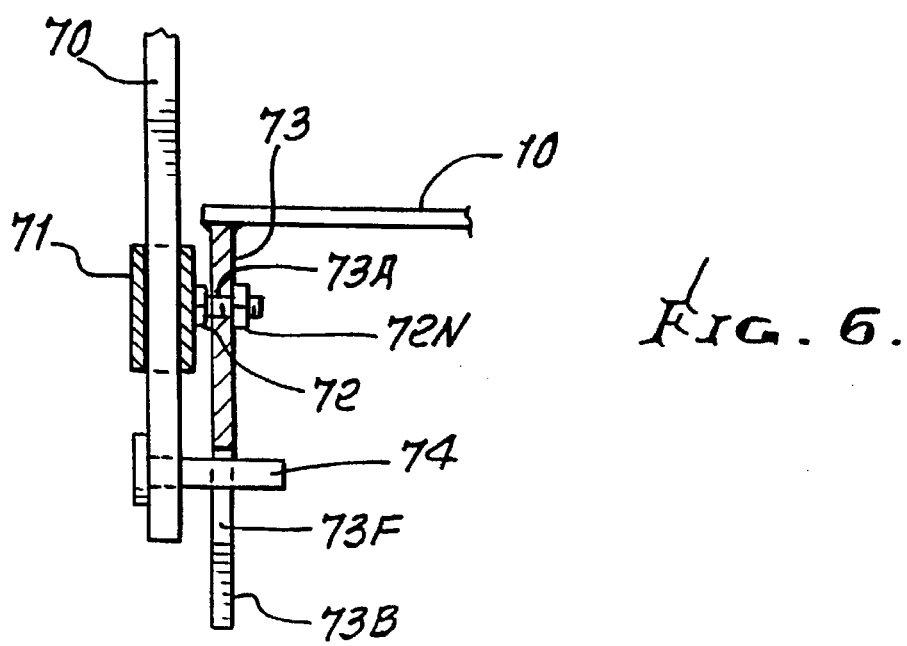
FIG. 6 is a partial sectional view of the arrangement of the operating lever taken along the line 6—6 of FIG. 5.

Now referring to FIGS. 5 and 6 a lever actuated loading lip extender will be discussed. The loading lip extender includes an operating arm or lever 70 of a preselected length to take advantage of the mechanical advantage of the lever so the operator need only exert approximatley 20 pounds of operating force for lifting the plates 10 and 11 that normally weigh on the order of 170 pounds. For this purpose, the preselected length for the operating lever 70 for satisfactory use may be 44 inches. The lever 70 is provided with a square slip tube 71 mounting a threaded bolt 72 having the bolt head secured thereto on one side of the slip tube 71 with the threaded end extending outwardly therefrom to adapt the lever 70 to be mounted to the bridge plate 10. For this purpose, a lever mounting bracket 73 is provided for securing the handle 70 at the slip tube 71 by means of the bolt 72 and a lock nut 72N. As best seen in FIG. 5, the lever mounting bracket 73 has its upper end formed with a tapered upper end 73 to be welded to the bottom of bridge plate 10 and extend at a preselected angle downwardly therefrom. The slip tube 71 is positioned on the lever 70 so that the threaded end of the bolt 72 will be coaxial with an aperture 73A on the bracket 73 and to be secured thereto by means of a nut 72N threaded to the shank of the bolt 72. The bottom end 73B of the bracket 73 as viewed in FIG. 5 has a preselected, elongated aperture 73E for providing a leg on each side of the aperture for receiving and mounting the operating lever 70 in the elongated aperture. To this end, the lower end of the lever 70 has a pin 74 secured thereto and extends outwardly therefrom in the same direction as the bolt 72. The mounting bracket 73 is secured to the bridge plate 10 to the outside of plate 10 and adjacent bumper box 12 with the lever 70 manipulated until the lever pin slides into the upper end of slot 73F, as best seen in FIG. 6, of the mounting bracket 73. The installation of the lever arm 70 permits it to be rotated in both directions to lift the bridge plate 10 upwardly when the operator moves the arm 70 downwardly and to lower the plate 10 when the arm 70 is moved upwardly with loading lip plate 11 following the motions of the bridge plate 10. When the arm 70 is moved forward, the loading lip plate 11 is forced outwardly and upwardly until it is extended over the truck bed, where it automatically drops into place. After the truck loading and/or unloading operation of the truck is completed, the lip plate 11 can be rotated out of the way to permit any truck door to be shut or if the truck is moved away from the dock LD, it will fall to its storage position as illustrated in FIG. 2.

Although the above describes the lever actuated lip extender, it should be recognized that the bridge plate 10 can be manually elevated or through the use of a hook as described in my above referenced patents. The lever actuated lip extender is preferable due to the reduced likelihood of back injuries and can be used at a safe location behind the leveler operating mechanism.

Keeping in mind the structure of the improved lip leveler operating mechanism, the operation thereof by means of the automatic lip extender will be described. When the plates 10 and 11 are in the storage position they can be elevated to the vertical cart stop position illustrated in FIGS. 3 and 4 by rotating the lever 70 backward or counter-clockwise from the position illustrated in FIGS. 2 and 5. This rotation of the lever 70 causes the bridge plate means 10 to rotate counter-clockwise or upwardly until it assumes the vertical orientation relative to the dock LD illustrated in FIG. 3. During this counter-clockwise travel the toggle arm means T will pivot upwardly in response to the upward movement of the bridge plate means 10 carrying the lip plate means 11 upwardly therewith. This pivoting motion is guided by the shaft 42S mounted to the slots 50A and 50B for the side plates A and B and causes the link arm means 42 to elevate therewith. The elevation of the link arm means 42 causes the follower wheel 43 to engage and follow the camming surface 25C and ride up the surface until it reaches its upper extremity or the cart stop position of FIG. 3. The mechanism operator will be aware that the toggle T and link arm 42 are locked in position when the locked position produces an audible "click". This cart stop position can be employed as an alternate stored position to prevent rolling stock from falling off the dock and will not affect the operation of a truck.

To position the loading lip plate over a truck bed parked adjacent the dock LD after the mechanism has been operated so that the vertical orientation of FIG. 3 is achieved, the lever 70 is then pushed forwardly or clockwise causing the lip plate means 11 to move outwardly and downwardly until it reaches its maximum height and extension over the truck bed. From this outward position the plate 11 will automatically drop onto the truck bed for the desired loading and/or unloading of the parked truck. With the completion of the loading and/or unloading of the truck bed, the operator may elect to pull the truck away from the loading dock LD whereby the plate 11 falls to the normal storage position of FIG. 1. If the truck is provided with a back door that must be closed while the truck is in motion, the lip 10 can be removed from the path of the door, by Operating the lever 70 backwardly to elevate the plates 10 and 11 until the plate 11 is clear of the truck and permits the truck door to be closed and secured.

It should now be evident to those skilled in the art edge mounted dock leveler mechanisms that the present disclosure has advanced the state of the art by providing an improved, simplified operating mechanism having reduced number of parts and permits it to be quickly mounted and released from its mounted position as a unitary structure. The improved mechanism inheres only two simple adjustments-and has been designed so if the mechanism is incorrectly used, it can be returned to normal operation without damage to the mechanism.

I claim:

1. An improved loading lip extender operating mechanism for edge mounted dock leveler wherein the dock leveler includes bridge plate means pivotably connected to said dock at one end thereof along an edge of said dock and normally assuming a horizontally aligned position with said dock and a loading lip extender plate means pivotably mounted to the opposite end of said bridge plate means from said one end thereof for pivotal movement with the movements of said bridge plate means and normally assuming a vertical orientation relative to said bridge plate means and said dock and a pair of spaced side mounting plates each having slotted aperatures for mounting a loading lip extender operating mechanism between said mounting plates by means of the slotted aperatures to accomodate the pivotal and sliding action of said operating mechanism in response to the elevation and descent of the bridge plate means, said improved loading lip extender mechanism comprising toggle arm means pivotably and releasably secured to said lip extender plate means on the back side thereof adjacent to and spaced from said pivotal connection of said bridge plate means and said lip extender plate means and extending downwardly between said pair of mounting plates, lower link means pivotably connected to said toggle arm means adjacent an end thereof with the lower link arm means pivotably and slidably mounted to the slotted aperature for said side mounting plates, said pivotal connection between said toggle arm means and said lower link arm means being consructed and defined so that when the bridge plate means is caused to pivot upwardly from its normal position the toggle arm means and lower link arm means respond to said pivoting action of the bridge plate means by pivotably moving upwardly into locking engagement with each other to thereby hold said bridge plate means in a preselected vertical relationship with said dock and with said loading lip extender plate means assuming an elevated position outwardly of said bridge plate means, camming surface means secured to the bottom side of said bridge plate means and having a planar, inclined tapered camming surface extending outwardly therefrom so as to be exposed upon elevation of said plate means, said pivotal connection between said toggle arm means and said lower link means including a follower wheel for engagement with said tapered inclined camming surface upon elevation of said plate means for providing said locking engagement of said toggle arm means and said lower link arm means in said preselected vertical positions with said dock, said inclined camming surface varying in depth decreasing from the top side to the bottom side thereof when said bridge plate means is elevated in a substantially vertical position and coacting with the follower wheel to permit said wheel to ride up the inclined camming surface until the locking engagement of said toggle arm means and said lower link arm means is achieved during the elevation of said bridge plate means and to ride down the inclined camming surface during the descent of said bridge plate means, and counter-balancing means mounted with said lower link arm means at one end thereof for exerting a preselected amount of force on said lower link arm means and adjustably secured to engage the dock for controlling the forces exerted so it functions to assist in lifting the weight of said bridge plate means and loading lip means through said lower link arm means and said toggle arm means and providing pressure during the downward movement of the bridge plate means and loading lip plate means for resisting the downward movement and thereby counter-balance said downward movement through said lower link arm means and toggle arm means said counter-balancing means being releasably secured for quick release and mounting.

2. An improved loading lip extender operating mechanism for edge mounted dock levelers as defined in claim 1 wherein said counter-balancing means comprises a heavy duty spring means mounted for exerting preselected forces on said lower link arm means.

3. An improved loading lip extender operating mechanism for edge mounted dock levelers as defined in claims 1 or 2 including manually operative lever means and means for coupling said lever means to said bridge plate means for permitting bidirectional rotation of said lever means for elevating said bridge plate means and thereby said loading lip extender plate means in response to the rotation of said lever means in a preselected direction and for forcing said loading lip extender plate means outwardly and upwardly for extension over a truck bed in response to the rotation of said lever means in the opposite direction from said preselected direction said means for coupling said lever means and said bridge plate means comprises a lever mounting bracket secured to the bottom side of the bridge plate and extending downwardly therefrom at a preselected angle when said bridge plate is in a substantially horizontal position, said mounting bracket including an elongated aperature at one end thereof and said lever means including means adjacent an end of the lever means for extending into and along said elongated aperature with the rotary movements imparted to the lever means.

4. An improved loading lip extender operating mechanism as defined in claims 1 or 2 wherein said toggle arm means includes lug means secured to said lip extender plate means and an adjustable arm means pivotably connected to said lug means at one end thereof and pivotably connected at the opposite end thereof to said lower link arm means.

5. An improved loading lip extender operating mechanism for edge mounted dock levelers wherein the dock leveler includes bridge plate means pivotably connected to said dock at one end thereof along an edge of said dock and normally assuming a horizontally aligned position with said dock and a loading lip extender plate means pivotably mounted to the opposite end of said bridge plate means from said one end thereof for pivotal movement with the movements of said bridge plate means and normally assuming a vertical orientation relative to said bridge plate means and said dock, the improvement including camming means secured to the underside of said bridge plate means so as to be exposed for camming when the bridge plate means is elevated to a substantially vertical position, said camming means having a camming surface shaped in the form of an inclined plane with a varying depth decreasing from the top side to the bottom side thereof when elevated in a substantially vertical position, and a loading lip extender operating mechanism mounted with said dock to be quickly releasable therefrom and including a cam follower arranged for engagement with said camming means constructed and defined to travel and follow along said inclined plane for releasably locking the bridge plate means in a vertical position relative to the dock.

6. An improved loading lip extender operating mechanism for edge mounted dock levelers as defined in claim 5 wherein said cam follower comprises wheel means for riding upwardly and downwardly along said inclined plane camming surface.

7. A lever actuated loading lip extender for use with edge mounted dock levelers, a loading/unloading dock having a dock leveler including a bridge plate pivotably connected to the dock at one end thereof along an edge of the dock and normally assuming a substantially horizontally aligned position with the dock and a loading lip extender plate pivotably mounted to the opposite end of the bridge plate from said one end thereof for pivotal movements with the movements of the bridge plate and normally assuming a vertical orientation relative to the bridge plate and the dock, the lever actuated loading lip extender comprising lever means for said bridge plate manually operable from the dock and having a preselected length, bracket means for coupling the lever means to said bridge plate on the outside of said bridge plate for permitting bi-directional rotation of said lever means for elevating the bridge plate in response to the rotation of said lever means in a preselected direction and for extending said loading lip extender plate forwardly and outwardly of the dock in response to the rotation of said lever means in the opposite direction from said preselected direction said means for coupling including said lever mounting bracket being secured to the bottom side of the bridge plate and extending downwardly therefrom at a preselected angle when said bridge plate is in a substantially horizontal position, tube means secured to the lever means and said mounting bracket at a preselected location spaced from the bottom side of the bridge plate, the lever means having a pin means mounted adjacent an end of the lever means and extending outwardly therefrom and movably coupled to the lever mounting bracket for transmitting elevating forces and extension forces to the bridge plate in response to the bi-directional rotation of the lever means for elevating the bridge plate to a preselected height and extending the loading lip extender plate outwardly and upwardly in response to extension forces applied to the bridge plate through the lever means.

* * * * *